US007818442B2

(12) United States Patent
Hershey et al.

(10) Patent No.: US 7,818,442 B2
(45) Date of Patent: Oct. 19, 2010

(54) STREAMING MEDIA ENCODER WITH FRONT PANEL CONTROL INTERFACE

(75) Inventors: Mark Hershey, Murphy, TX (US); David T. Stoner, McKinney, TX (US); Rick Southerland, Plano, TX (US)

(73) Assignee: Viewcast.Com, Inc., Dallas, TX (US)

( * ) Notice: Subject to any disclaimer, the term of this patent is extended or adjusted under 35 U.S.C. 154(b) by 1191 days.

(21) Appl. No.: 11/220,181

(22) Filed: Sep. 6, 2005

(65) Prior Publication Data

US 2007/0055787 A1 Mar. 8, 2007

(51) Int. Cl.
*G06F 15/16* (2006.01)

(52) U.S. Cl. ....................... 709/231; 709/230; 709/236; 709/219; 709/204; 709/217; 709/203; 725/105; 710/65; 710/62

(58) Field of Classification Search ................ 709/231, 709/203, 204, 223–225; 370/466, 401, 395.5
See application file for complete search history.

(56) References Cited

U.S. PATENT DOCUMENTS 6,741,463 B1 5/2004 Akhtar et al.
7,116,894 B1 * 10/2006 Chatterton .................. 386/95
2005/0055472 A1 3/2005 Krzyzanowski et al.
2005/0108519 A1 5/2005 Barton et al.
2005/0273825 A1 * 12/2005 Eldeeb ....................... 725/81
2005/0276270 A1 * 12/2005 Buinevicius et al. ..... 370/395.5
2007/0053379 A1 3/2007 Hershey et al.
2007/0189411 A1 8/2007 Goss

OTHER PUBLICATIONS

International Searching Authority, International Search Report for PCT/US2007/061376, Mar. 5, 2008.
International Searching Authority, Written Opinion for PCT/US2007/061376, Mar. 5, 2008.

* cited by examiner

*Primary Examiner*—Jude J Jean Gilles
(74) *Attorney, Agent, or Firm*—Howison & Arnott, LLP

(57) ABSTRACT

A streaming media encoder for encoding and delivering media content is disclosed. The streaming media encoder has a media input interface for receiving a media stream, a media encoder for receiving the media stream from the input interface and encoding the media stream, thereby producing an encoded media stream. The media encoder has a first confidence monitor for displaying a video image from the received media stream, a second confidence monitor for displaying a video image from the encoded media stream, and a network interface for providing the encoded media stream to a network.

23 Claims, 12 Drawing Sheets

800

405
450
830
815
825
810
830
840
850
850
850
850
115
125
145
105
160

1000
700
500
500
500
500
500
500
1050
1055
1060
1010
1012
1015
1020
CABLE COMPANY
1030

STREAMING MEDIA ENCODER WITH FRONT PANEL CONTROL INTERFACE

RELATED INVENTIONS

This application is related to and being filed concurrently with U.S. patent application Ser. No. 11/220,225, entitled "STREAMING MEDIA ENCODER WITH CONFIDENCE MONITOR," and filed on Sep. 6, 2005.

TECHNICAL FIELD OF THE INVENTION

The present invention relates to streaming media, and more particularly to a device for providing streaming media over the Internet or a private network.

BACKGROUND OF THE INVENTION

As the use of the Internet has become ubiquitous more services are being offered online. This includes not only interactive services for which the Internet is widely known, such as email, online shopping, online banking, and customized information services, but has also come to include services that have traditionally been non-interactive, such as the provision of radio programming and television programming. Streaming media, in primitive forms, has been present on the Internet for some time. However, as greater numbers of users gain access to high speed data lines through school, through work, or through a home based broadband solution more people will come to see the Internet in general, and streaming media in particular, as a viable alternative for the delivery of media content. This includes daily programming such as typically appears on network broadcasting stations as well as special event programming such as movies and sporting events.

Streaming media delivery is both promising and problematic. With traditional media delivery vehicles such as broadcasting and cable or satellite feeds, users typically must plan to be available when the broadcast is available or make other arrangements on their own. However with streaming media and Internet content, users expect delivery to be at their discretion. This can raise a variety of issues for providers as they attempt to deal with what is essentially replicating the broadcast event for every viewer. In addition to current and ongoing programming, providers are also faced with the problem of legacy programming that may still prove valuable, if it can be provided, more or less on-demand when viewers so request. The vast amount of programming currently available, as well as the large volume of non-digital legacy programming, can create problems associated with the scale or size of a given operation as well as with the technical difficulties involved in the delivery.

Therefore what is needed is a system and method for dealing with the issues discussed above and related issues.

SUMMARY OF THE INVENTION

The present invention disclosed and claimed herein, in one aspect thereof, comprises a method for monitoring an encoding process of an audiovisual media stream. The method includes receiving an input signal from an analog or digital audiovisual source, extracting a text feed from the audiovisual source, encoding the input signal to produce an encoded media stream, providing the encoded media stream to a network interface, and displaying the received input signal on a confidence monitor.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
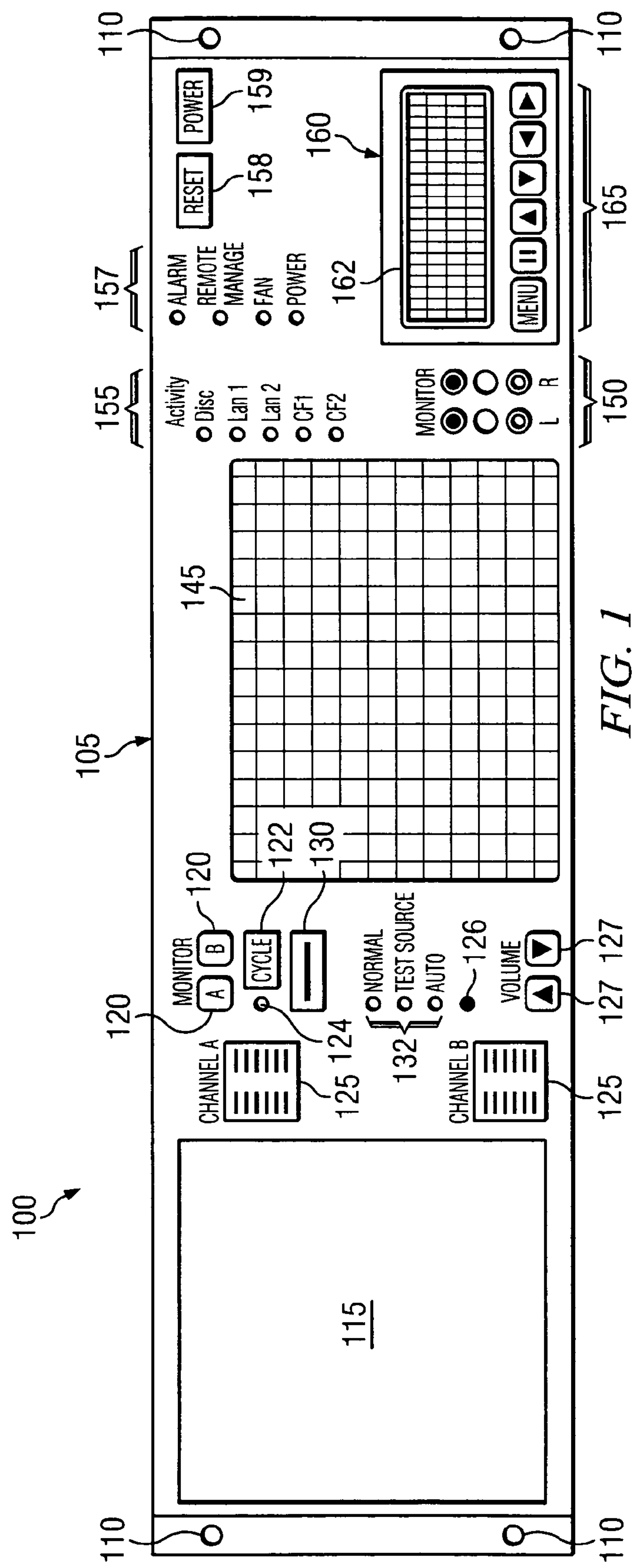
FIG. 1 is a frontal view of one embodiment of a streaming media encoder in accordance with aspects of the present disclosure.

Referring now to the drawings, and more particularly to FIG. 1, a frontal view of one embodiment of a streaming media encoder 100 in accordance with aspects of the present disclosure is shown. The streaming media encoder 100 has a front mounting plate 105, in which are mounted a number of interface implements as will be described. One or more mounting points 110, in this case bolt or screw holes, possibly including captive bolts or screws, may be provided at various locations on the front plate 105 to provide means for attaching the streaming media encoder 100 to a rack or other mounting point. A view screen, or confidence monitor 115, is provided along with monitor channel selection buttons 120. A cycle selection button 122 and indicator light 124 may also be provided. Audio level meters 125 are provided, which correspond to the two input channels A and B. A headphone jack 126 may also be provided for monitoring of the input audio signals. A volume control, in this case volume control buttons 127 may be provided to adjust the volume or gain of an input signal as played through the headphone jack 126. A selector switch 130 may be provided for switching the current mode of operation of the streaming media encoder 100. Associated with the selector switch 130 are a series of indicator lights 132 providing information regarding the currently selected mode of operation of the streaming media encoder 100. The streaming media encoder 100 may feature one or more ventilation grilles 145. The ventilation grille 145 may be located substantially near the center of the front plate 105 or in other locations according the needs of the user.

The streaming media encoder 100 may also provide a series of monitor outputs 150 which may be used to monitor the input signal, or in some embodiments, may also be used to view the encoded media signal, as will be described in greater detail below. A series of activity indicator lights 155 may serve to indicate to a user the current activity of the streaming media encoder 100. Similarly, a series of status lights 157 may be provided to indicate the status of various internal components of the streaming media encoder 100. Reset and power buttons 158, 159 are also provided. A system status monitor 160 may be provided, which may include a text display 160 and a series of control buttons 165.

The confidence monitor 115 may be a liquid crystal display (LCD) screen, a plasma screen, a cathode ray tube (CRT), or another type of display. The size of the confidence monitor 115 may be chosen to fit the needs of the user. In the present embodiment, the confidence monitor 115 is sized proportionately to fit the front plate 105 such that the confidence monitor 115 is viewable in the front plate 105 without hinges, swivels, or other adjustments. Likewise, the quality or resolution of the confidence monitor 115 may be chosen based upon the needs of the end user. The confidence monitor 115 may be able to produce video from phase alternate line (PAL) format, National Television Systems Committee (NTSC) format, or other transmission formats. In one embodiment, the confidence monitor may present a graphical representation of a set of controls using video graphics array (VGA) signals, super VGA (SVGA) signals, extended VGA (XVGA) signals, or another graphics representation standards.

The confidence monitor 115 is adapted to display a video loop feed from an input to the streaming media encoder 100 as will be described in greater detail below. In the present embodiment, the confidence monitor 115 can display the video loop from one of two distinct inputs to the streaming media encoder 100. The two inputs may be referred to as channels A and B. Command buttons 120, or other selection means, may be provided to allow a user to choose which channel is to be displayed on the confidence monitor 115. The command buttons 120 and other buttons shown on the front plate 105 may, in come cases, be replaced with rotary knobs, dials, slides, touchscreens, or other suitable user input implements. The buttons may provide analog or digital signals as dictated by the specific implementation of the streaming media encoder and the needs of the user. In one embodiment, the command buttons 120 and other buttons shown may be pressure sensitive or solid state buttons.

The user may also have the option to have the confidence monitor 115 cycle between channels A and B by pressing the cycle selection button 122. In additional embodiments, more channels may be provided to the confidence monitor 115. The confidence monitor 115 may cycle between channels A and B at a predetermined interval (e.g., displaying each for 5 seconds and then switching) or the user may be able to program the cycle length using a system status monitor or via remote configuration as described below. A cycle indicator light 124, which may be a light emitting diode (LED) or other selectable light source may provide immediate indication that the confidence monitor 115 is in cycle mode. In another embodiment, the confidence monitor 115 may be configured to provide a split screen view such that both channels A and B are displayed simultaneously. In further embodiments, the user may also have the option of having the confidence monitor display the encoded output signal. In such case, an internal decoder may be used to decode the encoded output signal and provide a video feed back to the confidence monitor 115.

In addition to the input video loop feeds associated with each of channels A and B, audio loop feeds for each channel may be monitored by audio level meters 125. The audio level meters 125 may be bar graph style light emitting diode (LED) meters and may provide level information for stereo audio signals. Using the audio level meters 125, an operator may be able to ascertain visually whether the input audio signals are present. Volume buttons 127 may be provided to allow the user to adjust the volume level of the audio input feed as delivered to the headphone jack 126. In another embodiment, the streaming media encoder 100 will have one or more internal speakers for monitoring the input signal in addition to, or instead of, the headphone jack 126.

Additional command buttons and indicator lights associated with the confidence monitor 115 may also be provided. For example, shown in the present embodiment is command button 130 which serves as a mode selector for selecting the overall operative mode of the confidence monitor 115. Indicators lights 132 may also be provided that indicate visually to a user the current mode of operation of the confidence monitor 115. In the embodiment shown, there are indicator lights 132 corresponding to "NORMAL" mode, "TEST SOURCE" mode, and "AUTO" mode. NORMAL mode may correspond to a mode of operation where normal audiovisual inputs are being displayed on the confidence monitor 115 and encoded by the streaming media encoder 100. TEST SOURCE mode may correspond to a test signal being displayed by the confidence monitor and/or the audio level meters 127 rather than an actual input feed. AUTO mode may correspond to a mode for displaying video and audio on the confidence monitor 115 and audio level meters 127, respectively, when a signal is available, and for displaying a test signal otherwise. Although three modes of operations and their associated indicator lights have been described, the streaming media encoder 100 is not meant to be so limited, as other modes of operation are contemplated and fall within the scope of this disclosure.

The grating or grille 145 may be formed directly on the front panel 105 or it may be a discrete, attached component. In some embodiments, the grille 145 may be removable to facilitate cleaning or to access the inside of the streaming media encoder 100. The grille 145 may serve to provide airflow or ventilation to the components inside the streaming media encoder 100. In one embodiment, the grille 145 serves as a covering for one or more speakers (not shown) which may correspond to the audio signal of the selected input channel. The grille 145 may also serve as a covering for one or more electric fans (not shown) to provide forced air cooling of the streaming media encoder 100.

A number of monitor output connections 150 may be provided. These monitor output connections 150 correspond to the input channels A and B. In another embodiment the output connections 150 may also correspond to a decoded version of the encoded output signals of the streaming media encoder. The encoded output signals are also provided at the rear of the streaming media encoder 100 as will be described in greater detail below. The output connections 150 themselves may be of an industry standard type, such as Radio Corporation of America (RCA) connectors. In one embodiment, a separate connector 150 may be provided for each stereo audio component and for the video signal component corresponding to each of channels A and B.

Additional indicator lights 155, 157 may be provided for displaying additional information visually without the need to interact with the streaming media encoder 100. The indicator lights 155 may be "Activity" lights that may illuminate when an internal disc is being accessed, when a local area network (LAN) connection is active, or when some other activity is occurring. The indicator lights 157 may correspond to alarm conditions or other conditions that may require attention to the streaming media encoder 100. For example, indicator lights 157 may indicate an alarm or fault condition such as high voltage, a fan failure, or a power supply failure. In this case, the indicator lights 157 may have a separate power supply, such as a battery backup, such that the indicator lights 157 remain operable even when power to the streaming media encoder 100 has been interrupted. A "RESET" button 158 may be provided that will reset the entire streaming media encoder 100. A "POWER" button for controlling the main power to the streaming media encoder 100 is also provided.

The system status monitor (SSM) 160 is also provided in an accessible and viewable location on the front plate 105. The SSM 160 includes a text display area 162. In the present embodiment, the text display area may be a liquid crystal display (LCD) having one or more lines for displaying the text of user requested information and for providing user prompts for the adjustment and configuration of system settings for the streaming media encoder 100. The text display 162 may also provide information during alarm conditions. A set of buttons 165 is provided near the text display 160 and may be utilized to provide user input for configuring the streaming media encoder 100. Information that may be displayed on the text display 162 of the SSM 160 as well as the functions and settings accessible using the text display 162 and buttons 165 is described in greater detail below with regard to the menu system.

Figure 2:
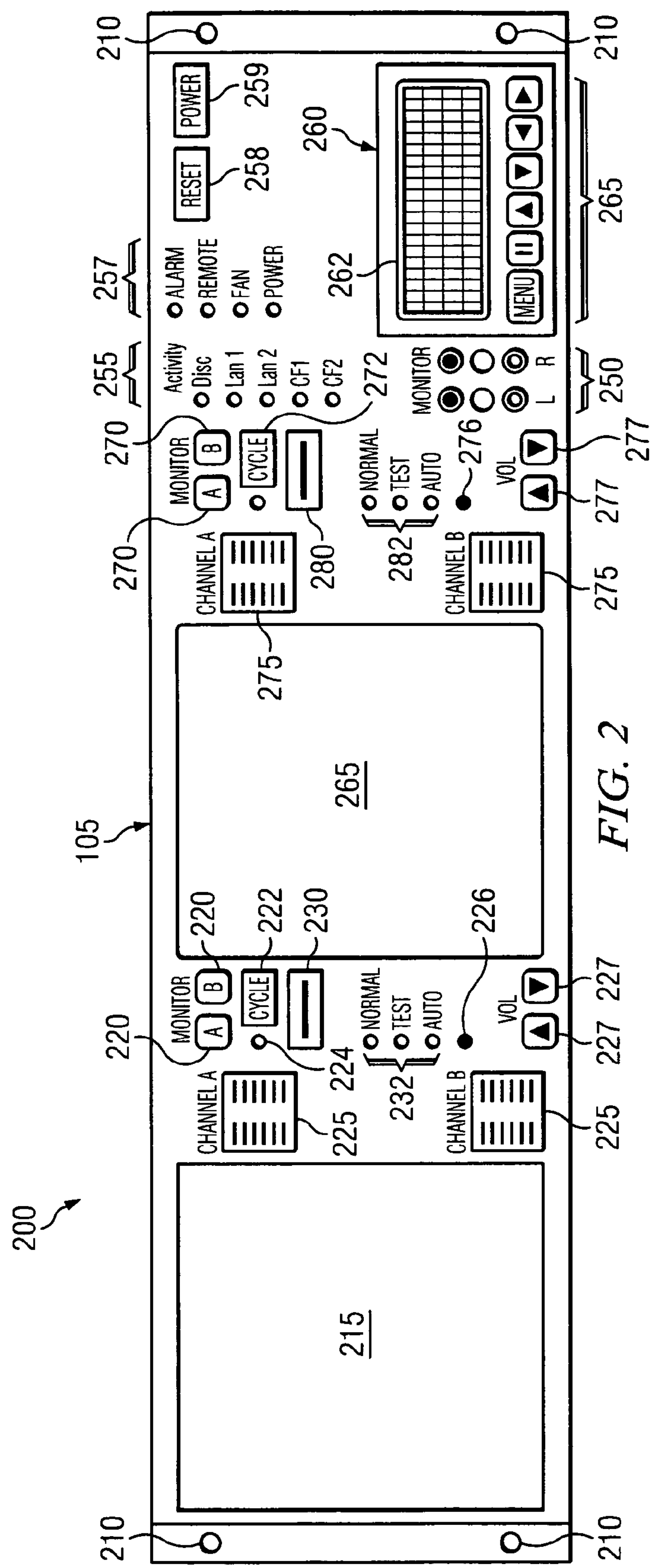
FIG. 2 is a frontal view of another embodiment of a streaming media encoder in accordance with aspects of the present disclosure.

Referring now to FIG. 2, a frontal view of another embodiment of a streaming media encoder 200 in accordance with aspects of the present disclosure is shown. The streaming media encoder 200 is substantially similar to the streaming media encoder 100 discussed above. The streaming media encoder 200 has a front mounting plate 205, in which are mounted a number of interface implements. One or more mounting points 210, possibly including captive fasteners, may be provided at various locations on the front plate 205. A first view screen, or confidence monitor 215, is provided along with monitor channel selection buttons 220. A cycle selection button 122 and indicator light 224 may also be provided. Audio level meters 225 may be provided, which correspond to audio signals for channels A and B. Volume control buttons 227, may be provided to adjust the volume or gain of an input signal as relayed through the headphone jack 226. A selector switch 230 may be provided for switching the current mode of the streaming media encoder 100. Associated with the selector switch 130 are a series of indicator lights 132 providing information regarding the currently selected mode of operation of the first confidence monitor 215. The streaming media encoder 200 may also provide a series of monitor outputs 250 which may be used by a user to monitor the encoded media signal. A series of activity indicator lights 255 may serve to indicate to a user the current activity of the streaming media encoder 200. A series of status lights 257 may be provided to indicate the status of various internal components of the streaming media encoder 100. Reset and power buttons 258, 259 are also provided. A system status monitor 260 may be provided that may include a text display 260 and a series of control buttons 265.

In addition to the features shared with the streaming media encoder 100 of FIG. 1, the streaming media encoder 200 includes a second confidence monitor 267. The second confidence monitor 267 may be substantially similar to the first confidence monitor 215. However, the second confidence monitor 267, may be used to monitor the encoded video signal rather than the input signal. In such case, an internal decoder first decodes the encoded output audio and video signal and provides the video portion of the signal to the second confidence monitor 267. In this manner, the streaming media encoder 200 provides encoding and pre- and post-encoding confidence monitoring for at least two input channels. As with the first confidence monitor 215, the second confidence monitor may be set to display an output channel A or B by command buttons 270, or set to cycle by using command button 272. As with the first confidence monitor 215, a headphone jack 276 and output volume control buttons 277 may be provided as well as one or more additional selector switches 280 for switching between operating modes such as NORMAL, TEST, and AUTO. The operating mode of the second confidence monitor 265 may be shown by indicator lights 282.

Figure 3A:
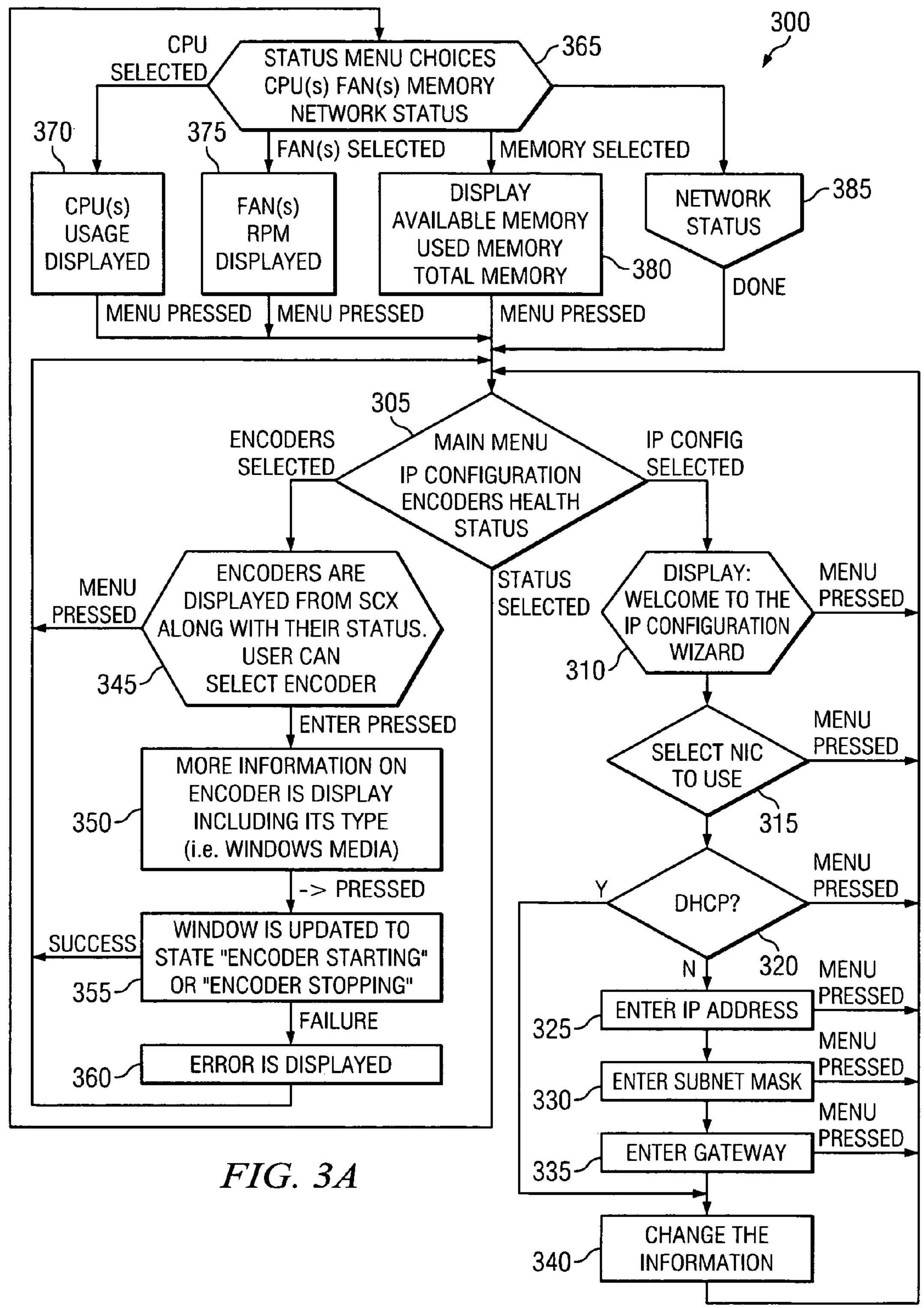
FIG. 3 is a flow diagram of one embodiment of a menu system of a system status monitor for a streaming media encoder in accordance with aspects of the present disclosure.
Figure 3B:
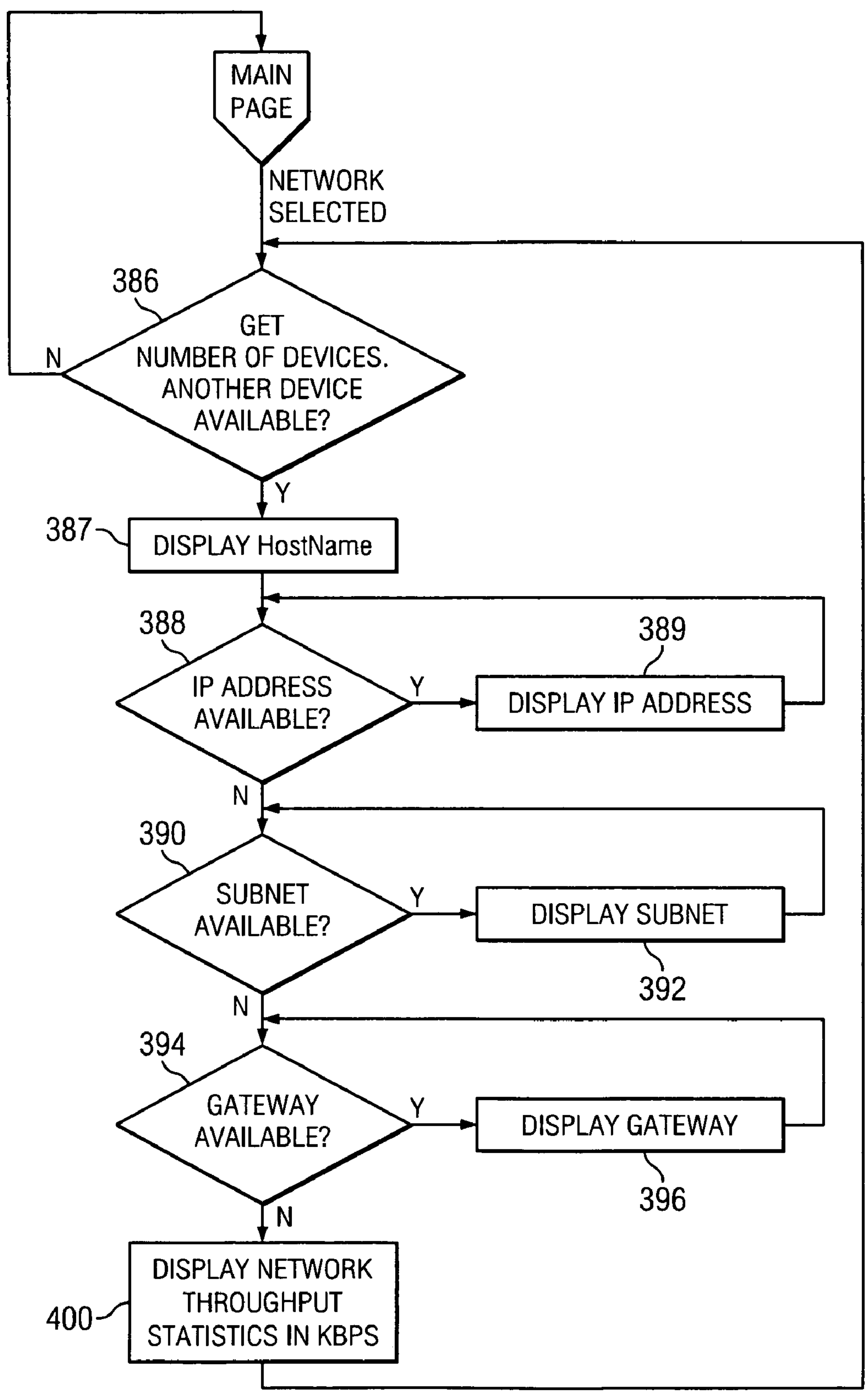

Referring also now to FIG. 3, a flow diagram 300 of one embodiment of a menu system of a system status monitor (SSM) for a streaming media encoder in accordance with aspects of the present disclosure is shown. The system status monitor of 160 of FIG. 1 and 260 of FIG. 2 may be used to provide real time information and data regarding the performance of the streaming media encoder 100 and 200, respectively. Command buttons 165, 265 are used to operate the menu system and request specific information for display on the text displays 162, 262. The system status monitor may also be used to configure and setup the streaming media encoder 100, 200 for operation. The menu system 300 illustrated in FIG. 3 provides one example of the data display and configuration operations that may be accessible via the system status monitor 160, 260. In some embodiments, not all the operations illustrated will be implemented, and in other embodiments there will be additional operations not shown here.

At step 305 a user is presented with a main menu. In this embodiment, the main menu includes 3 options, "IP Configuration," "Encoders," and "Health Status." As can be seen from the flow diagram 300, the main menu, or the immediately preceding menu, may generally be selected by pressing the menu key, such as may be made available through command buttons 165, 265. The other options presented on the menu may be accessed by using provided directional command buttons 165, 265 and then by pressing an enter command button 165, 265. In the present example, a user may highlight "IP Configuration" at step 305 and press the enter command button 165, 265 and then be presented with the prompt of step 310, "Welcome to the IP Configuration Wizard." The SSM 160, 260 then presents the user with the option to select which network interface card (NIC) to configure at step 315. As will be described below, the streaming media encoder 100, 200 may have multiple NICs. The user makes a selection, again using command buttons 165, 265, and is presented with the option to configure the NIC using dynamic host configuration protocol (DHCP) at step 320. If DHCP is not to be used, the user enters the desired internet protocol (IP) address at step 325, the subnet mask at step 320, and the gateway at step 335. The information is then updated within the streaming media encoder 100, 200 at step 340. In the event that the user selects to utilize DHCP at step 320, steps 325-335 are bypassed as the configuration information will be obtained from the host. Upon completion of the information update at step 340, the SSM 160, 260 returns to the main menu of step 305.

At step 305, if a user enters the "Encoders" selection, the encoders menu is presented at step 345. A list of encoders present is displayed along with the status of the installed encoders. The SSM 160, 260 may communicate with the internal encoders using codec control and management software. The user may select a specific encoder in order to obtain more specific information at step 350. At step 350, additional information may be displayed including the format that is output by the encoder (e.g., Windows Media format), as described more fully below. The user may select to start or stop the present encoder and information may be displayed regarding the status of the encoder (e.g., "starting," or "stopping) at step 355. In the event that a failure occurs, the user is presented with an appropriate error message at step 360. If the start or stop operation is successful, the display 162, 262 returns to the main menu at step 305.

From the main menu 305, the user may select "Health Status" and be presented with the status menu at step 365. The status menu may present further choices such as "CPU(s)," "Fan(s)," "Memory," and "Network Status." If the user selects "CPU(s)," information corresponding to the internal processing unit, or units, may be presented at step 370. Such information may include speed, fault status, percent utilization, temperature, etc. If the user selects "Fan(s)," information regarding the internal fans is displayed at step 375. This information may include operating status, performance information, failure information, revolutions per minute (RPM), etc. If the user selects "Memory," information regarding system memory may be displayed at step 380. This information may include total system memory, memory used, memory available, RAMdisk availability and information, and memory faults. In other embodiments additional information may be available on this or another menu such as additional internal temperatures, power supply voltages, operating hours or uptime, and OS and other software version information.

From the main menu 305, the user may also choose "Network Status" and view information regarding available hosts, NICs, and other devices on the network. At step 386, if there are devices available, the hostname is displayed at step 387. If an IP address is available at step 388 it is displayed at step 389. If no IP address is available at step 388, and if a subnet is available at step 390, the subnet is displayed at step 392. If no subnet is available at step 390, and if a gateway is available at step 394, the gateway is displayed at step 396. The network throughput (e.g., kilobits per second) is then given at step 400. If further devices are present on the network at step 386, steps 387-400 may repeat. In some embodiments information may be available regarding internal NICs such as assigned IP addresses, NIC network statuses, and performance information (e.g., throughput).

Figure 4:
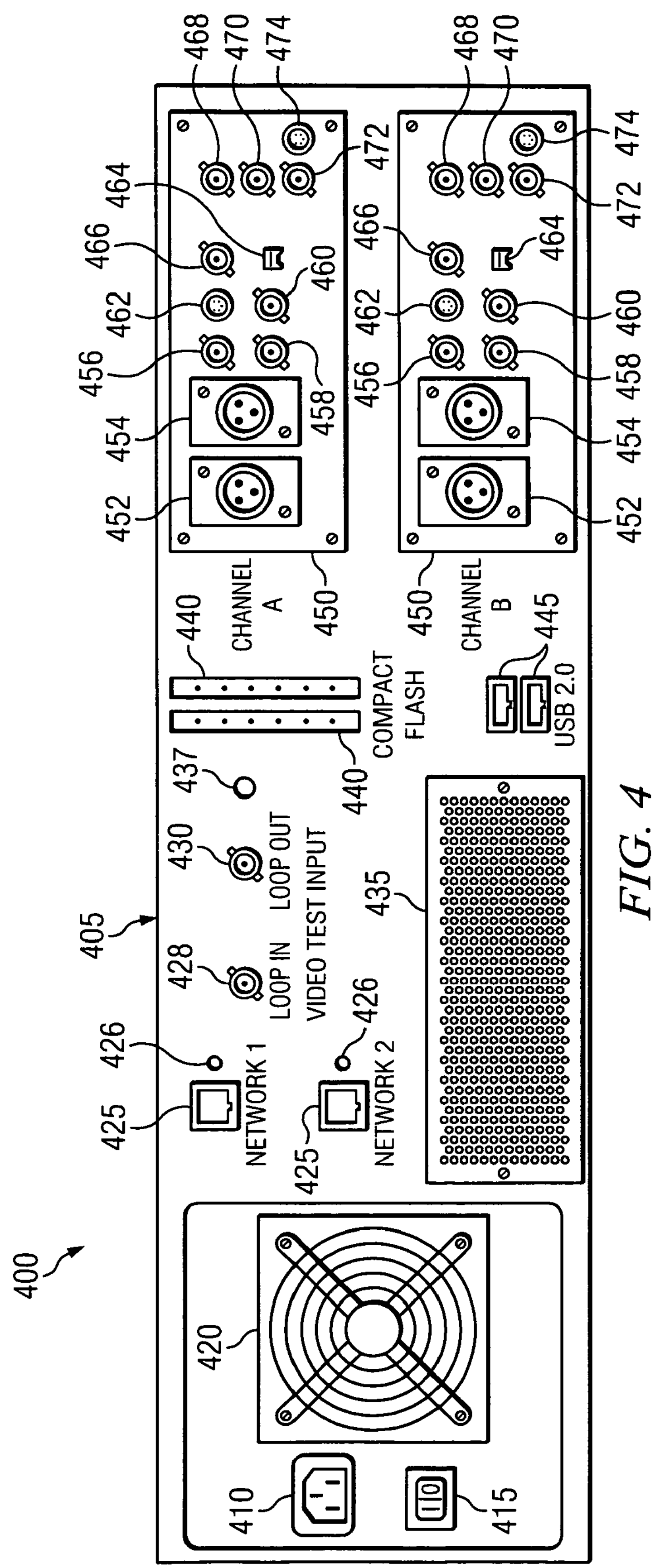
FIG. 4 is a rear view of one embodiment of a streaming media encoder in accordance with aspects of the present disclosure.

Referring now to FIG. 4, a rear view of one embodiment of a streaming media encoder 400 in accordance with aspects of the present disclosure is shown. The streaming media encoder 400 may be substantially similar to the streaming media encoders 100, 200 previously discussed. A rear panel 405 is shown which provides mounting locations for various inputs and outputs. A power connection 410 is shown which may be a standard 110/220 volt connector. A master power switch 415 is shown which may control the main internal power supply. An exhaust vent 435 may be provided and may be formed integrally with the rear panel 405 or may be removable. LAN connections 425 are provided as a network interface. Indicator lights 426 may be provided to indicate LAN activity. The LAN connections 425 may be standard RJ-45 connectors or another suitable connectors interfacing to internal NICs. In one embodiment, the streaming media encoder 400 may be controllable and configurable via a LAN connection 425. Through the LAN connection 425, a user may have similar or greater control over the streaming media encoder 400 as if using a system status monitor (SSM) as previously discussed with reference to FIGS. 1-3. Additional functionality may be provided such as the ability to upgrade software in the streaming media encoder 400. In one embodiment, the LAN connection 425 or the SSM as previously described, may be used to force an automatic update of the streaming media encoder 400 using codec control and management software.

A test signal loop input 428 may be provided on the streaming media encoder 400 as well as a test signal loop output 430, which may then be used to provide a loop input to another nearby device. The loop input 428 and output 430 may be standard Bayonet Neill-Concelman (BNC) connectors or other connectors. In one embodiment, the streaming media encoder 400 is capable of generating an internal test signal for display on a front panel confidence monitor as previously discussed. Media card slots 440 may be provided for loading and unloading media, programming, firmware upgrades, encoding protocols, or other information. The media card slots 440 may be configured to accept Compact Flash cards, Secure Digital cards, or some other available media card type. The media card slots 440 may also be capable of accepting more than one different type of media card. Universal Serial Bus (USB) ports 445 are provided that may allow a user to attach an external Input/Output (I/O) device such as a mouse or keyboard. One or more VGA, SVGA, XVGA, or other video connections may be provided on the streaming media encoder 400 to be used with an external display device. An external display device may be used on conjunction with a keyboard, mouse, or other device interfacing through the USB ports 445 to gain local access and control of the streaming media encoder 400.

Two input/output channels 450 A and B are shown, but more or fewer may be provided as dictated by the needs of the user. As can be seen in FIG. 4, a variety of options may be provided for connecting the input and output signals. Left and right external live return (XLR) inputs 452, 454 are provided for balanced audio input. These may provide both analog and digital capabilities. Standard left and right Radio Corporation of America (RCA) connectors 456, 458 may be provided and offer an unbalanced audio input. Bayonet Neill-Concelman (BNC) connectors 460 may be provided and may be capable of accepting both audio and video over a serial digital interface (SDI). Mini Deutsche Industry Norm (mini-DIN) connectors 462 for providing S-video signal inputs may also be placed on the rear panel 405. Other inputs include Institute of Electrical and Electronics Engineers 1394 standard (IEEE-1394) connectors 464 for accepting both audio and video over a digital video (DV) interface, and BNC connectors 466 for receiving composite video.

The primary output mechanism for the streaming media encoder 400 will be the LAN connections 425. In one embodiment, the streaming media encoder 400 has a mode of operation where a portion or all of the generated output is stored on an internal mass storage device. However, monitoring options may also be provided on the rear panel 405. Output options on channels A and B 450 may include left and right RCA outputs 468, 470, BNC composite video outputs 472, and S-video outputs 474. The signal actually provided on the outputs may correspond directly to the input signal. In this manner the input signal may be viewed using the outputs of the streaming media encoder 405. In another embodiment, the signal provided on the outputs may come from an internal decoder which decodes the encoded output signal for immediate external viewing.

Figure 5:
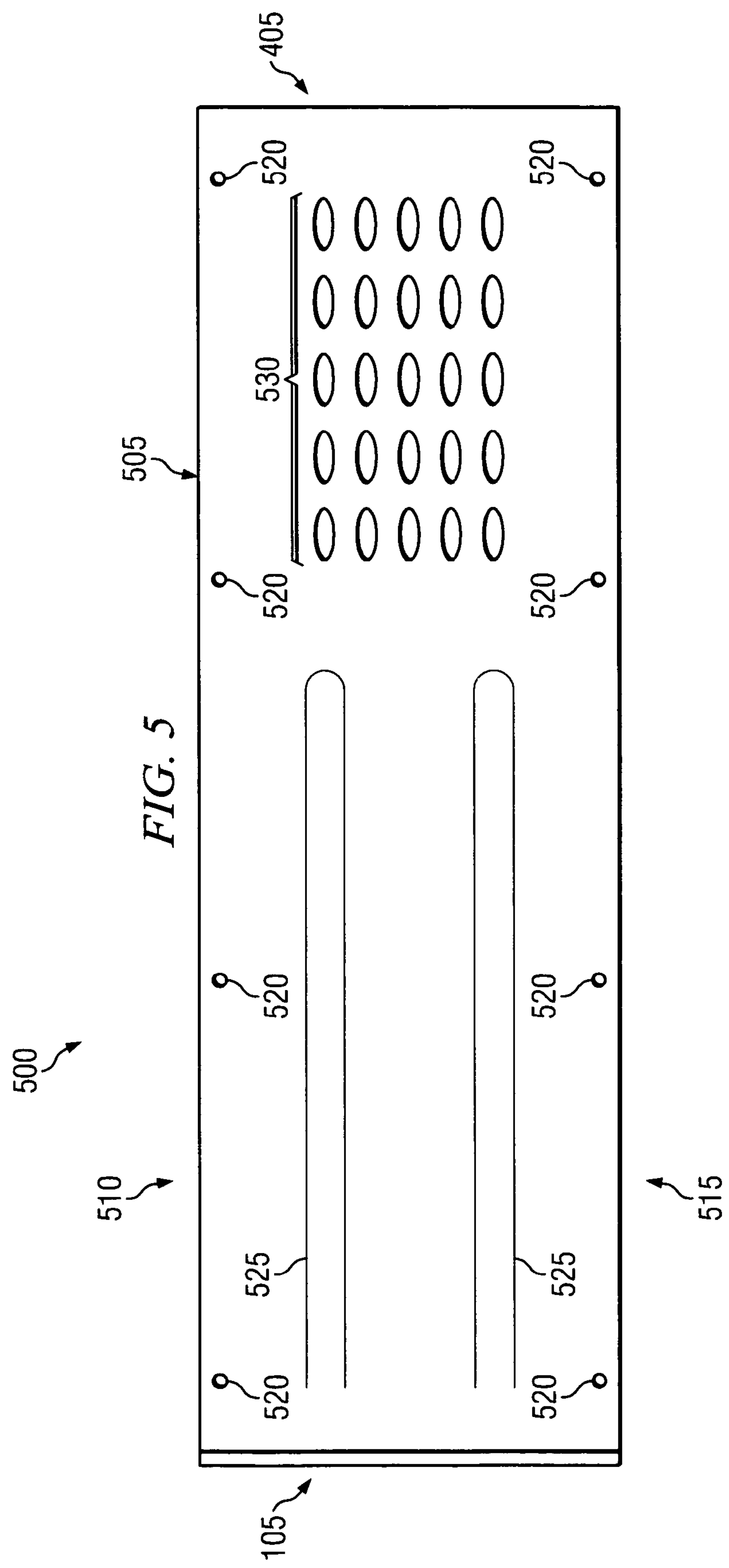
FIG. 5 is a side view of one embodiment of a streaming media encoder in accordance with aspects of the present disclosure.

Referring now to FIG. 5, a side view of one embodiment of a streaming media encoder 500 in accordance with aspects of the present disclosure is shown. Front panel 105 as previously described (or the front panel 205 of FIG. 2), attaches to a side panel 505. Similarly rear panel 405 is also attached. Two side panels 505 may be provided along with top panel 510 and bottom panel 515 such that a full enclosure for the streaming media encoder 500 is provided. Some of the panels 105, 405, 505, 510, 515 may be formed integrally or they may be formed separately and attached. Screw or bolt holes 520, possibly having captive fasteners, may serve to connect the panels 105, 405, 505, 510, 515. Slots or grooves 525 may be formed in the side panels 505 of the streaming media encoder 500 to aid in installation of the device. Ventilation grating 530 may be provided to aid in cooling of the streaming media encoder 500.

Figure 6:
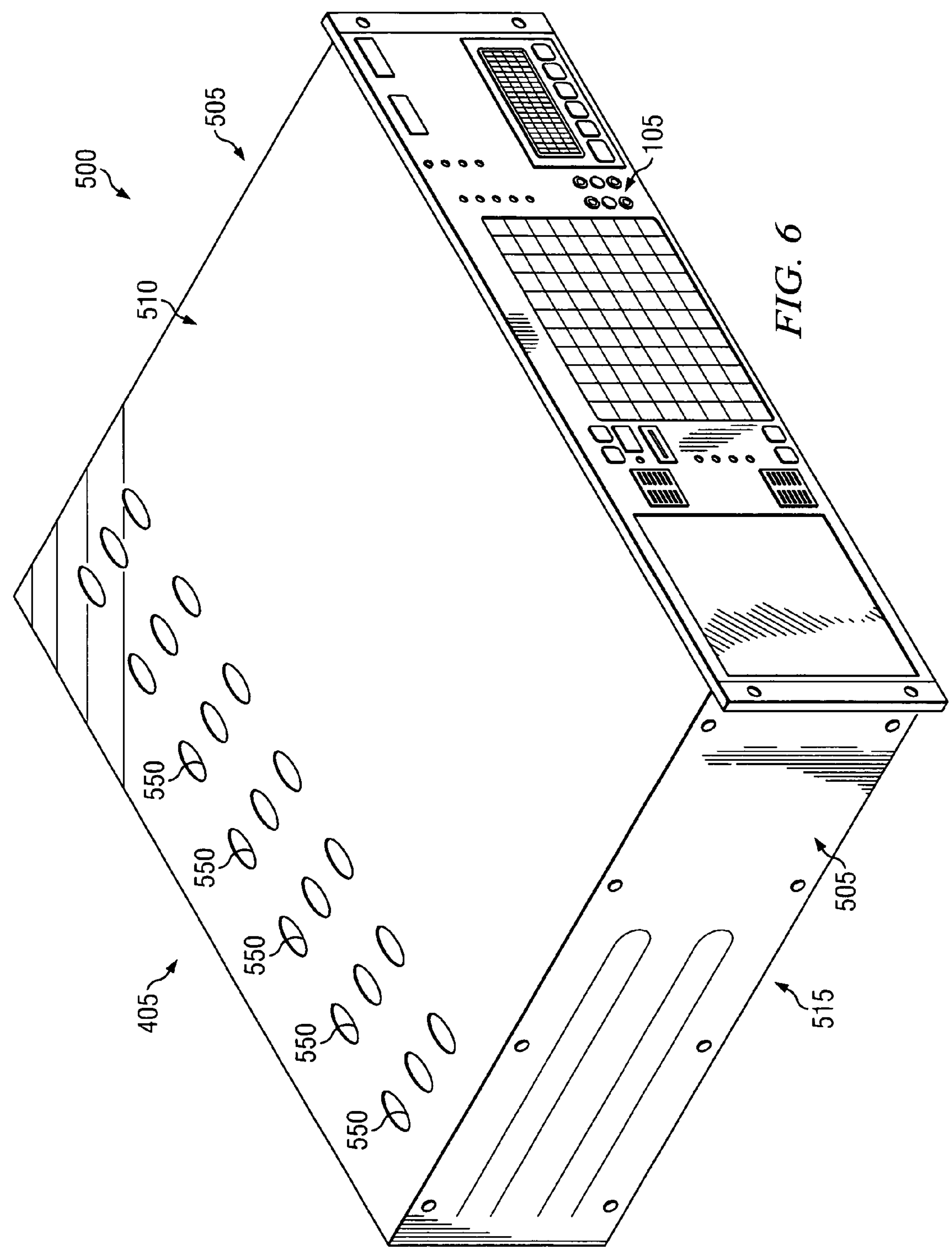
FIG. 6 is a perspective view of the streaming media encoder of FIG. 5.

FIG. 6 is a perspective view of the streaming media encoder 500 of FIG. 5. From this perspective view it can be seen that the panels 105, 405, 505, 510, 515 come together to form a full enclosure for the streaming media encoder 500. The various dimensions of the panels 105, 405, 505, 510, 515 may be chosen to fit the needs of the user and any requirements for the internal size of the streaming media encoder 500 owing to internal componentry. In one embodiment, the streaming media encoder 500 will be of an industry standard size for mounting in a rack-based enclosure. For example, the streaming media encoder 500 may be a 2U rack-mount size (3.5 inches high×19 inches wide×22 inches deep). In some embodiments, the top panel 510 and/or the bottom panel 515 provide additional ventilation, such as ventilation grid 550.

Figure 7:
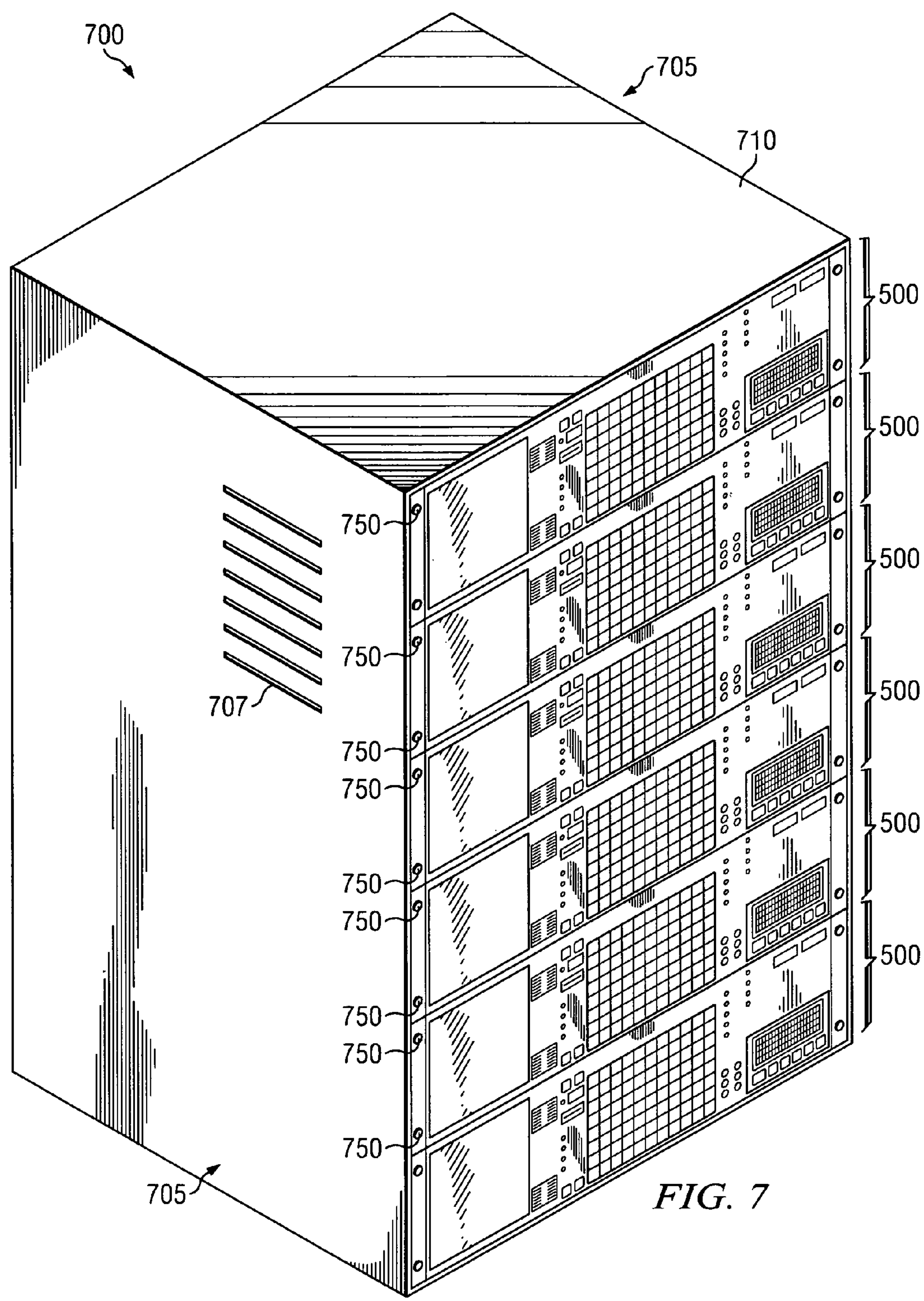
FIG. 7 illustrates a plurality of streaming media encoders in one embodiment of a rack mounting system in accordance with aspects of the present disclosure.

Referring now to FIG. 7, a plurality of streaming media encoders in one embodiment of a rack mounting system 700 in accordance with aspects of the present disclosure is shown. A plurality of streaming media encoders 500, as previously described, may be mounted in a single rack system 700. The rack system 700 may provide side panels 705, possibly with ventilation grates 707, and a top panel 710. The front and back panels of the streaming media encoders 500 may left open and accessible. Mounting holes 750 on the streaming media encoders 500, as previously described, can be used to secure the encoders into the rack 700. In one embodiment, the mounting holes 750 may have captive fasteners, such as screws or bolts, to aid in securing the streaming media encoders 500 to the rack 700. The rack 700 is meant to illustrate only one possible example and in other embodiments a rack system may have more or fewer components and hold more or fewer streaming media encoder 500 than shown in FIG. 7.

Figure 8:
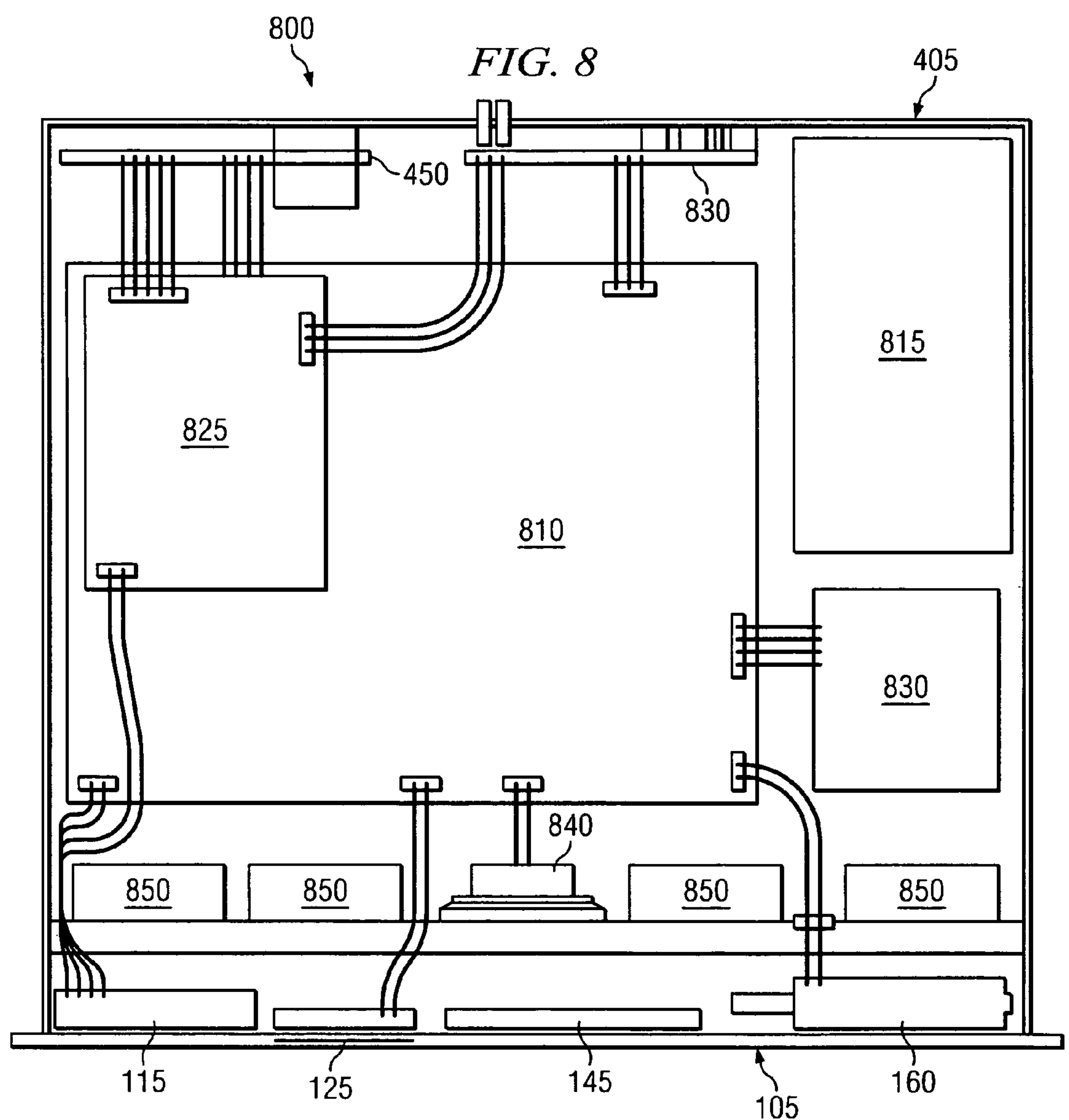
FIG. 8 is a schematic diagram of a streaming media encoder according to aspects of the present disclosure.

Referring now to FIG. 8, a schematic diagram of a streaming media encoder according to aspects of the present disclosure is shown. The streaming media encoder 800 is substantially similar to those previously described. A main logic board 810 is powered by a power supply 815. The main logic board 810 has one or more video capture cards 825 communicatively coupled thereto. The video capture cards are attached to a series of I/O ports 450, as previously described, which are mounted in the back panel 405. Both the video capture card 825 and the main logic board 810 may also be interfaced to additional communication and control ports 830 (e.g., loop I/O, USB, NICs, and media ports as described previously with respect to FIG. 4). The main logic board 810 is also interfaced to mass storage device 830, which may be powered by power supply 815. Similarly, the main logic board 810 is interfaced to the front panel 105 which includes the confidence monitor 115, audio level 125 meters, system status monitor (SSM) 160 and the additional command buttons described with respect to FIG. 1. An optional internal speaker 840 is provided behind front grille 145. A series of cooling fans 850 may also be provided at various locations within the streaming media encoder 800.

The main logic board 810 may be a commercially available, off-the-shelf unit, such as a personal computer mother board. In other embodiments, the main logic board 810 may be specifically built for its purpose. The main logic board 810 and other components of the streaming media encoder 800 may be powered by the power supply 815, which may be a commercially available personal computer power supply. The main logic board 810 will include the necessary ports, memory, and other hardware to interface with all of the necessary internal components of the streaming media encoder 800. The main logic board 810 may also support the operation of one or more central processing units (CPUs) (not shown). In one embodiment, the main logic board 810 has an integrated hard drive controller for interfacing with the mass storage device 830.

The video capture cards 825 may be separate components that mount into a bus provided on the main logic board 810. The video capture cards 825 may be Osprey 560 video capture cards produced by ViewCast Corporation of Dallas, Tex. In another embodiment, the video capture cards 825 are integrated into the main logic board 810. The video capture cards 825 may be used to take an analog or digital input signal, which may include audio or video signals, and convert the signals into a streaming media format. In some embodiments, the video capture cards 825 may also encode the captured digital signal into a desired streaming media format. In other embodiments, the main logic board 810 will take the captured digital signal and encode it into a streaming media format. Examples of encoded formats can include, but are not limited to, Windows Media format from Microsoft Corporation of Redmond, Wash., Real Media format from Real Networks, Inc., of Seattle, Wash., Flash Video format from Macromedia, Inc., of San Francisco, Calif., QuickTime format by Apple Computer, Inc., of Cupertino, Calif., and various standards from the Motion Pictures Expert Group (MPEG). In some embodiments, the video capture cards 825 may be upgradable such as by replacing the firmware, or by loading new programming data from the main logic board 810. The video capture cards and the hardware or software components of main logic board 810 may also be adapted to support Digital Rights Management (DRM) and other intellectual property protection schemes.

The mass storage device 830 may be a commercially available personal computer or notebook computer hard disk drive. In other embodiments the mass storage device will be purpose built. The mass storage device 830 may include redundancy or other data protection measures. The mass storage device may also include encryption for data protection. In another embodiment, the mass storage device 830 may be a solid state device such as a flash-based drive. The mass storage device may be used to store and access the programming and operating system for the streaming media encoder 800. In one embodiment, the operating system for the streaming media encoder 800 will be Windows XP Professional, from Microsoft Corporation of Redmond, Wash. In other embodiments, the operating system may be an open source or purpose built system.

The speaker 840 is also a commercially available component. The speaker 840 may be a low-power speaker that can be powered from integrated amplifiers within the streaming media encoder 800. Similarly, the fans 850 may be commercially available, off the shelf components. In other embodiments, the fans 850 may be specifically chosen or designed to take advantage of specific airflow properties within the streaming media encoder 800 or its mounting enclosure.

Figure 9:
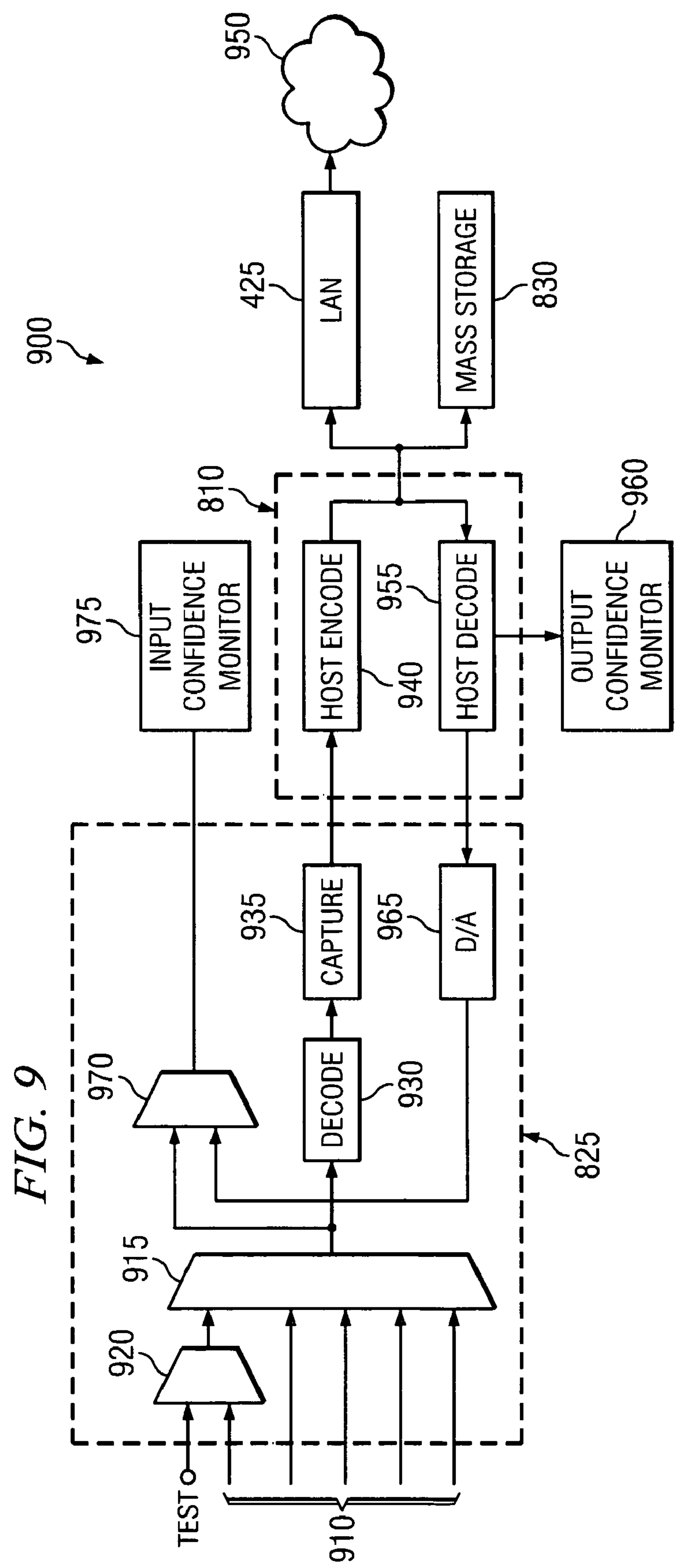
FIG. 9 is a functional block diagram of a streaming media encoder according to aspects of the present disclosure.

FIG. 9 is a functional block diagram 900 of a streaming media encoder according to aspects of the present disclosure.

Shown is a main logic board 810 and a video capture card 825, both previously described. A series of signal input leads 910, which correspond to the input connections previously described are connected into multiplexer 915. Additionally, one or more of the input leads 910 may be separately multiplexed with a test signal by multiplexer 920. From multiplexer 915, the selected input lead is fed to a decoder 930. The decoder 930 resides on the video capture card 825 and converts the input signal from various formats and digitizes it before it is passed to the capture mechanism 935. From the capture mechanism 935, the digitized input signal is made available to a host encoder 940.

The host encoder 940 may be a function of the main logic board 810, or in another embodiment, a function of the capture card 825. As described before, the host encoder 940 can convert the digitized input signal into a desired output format, which includes media formats which may be streamed to an end user or viewer. The encoded signal may be transmitted via one or more LAN connectors 425 over a network 950 (such as the Internet) to an end user, or the encoded signal stored on the mass storage device 830 for later retrieval.

The encoded output signal may also be provided to a host decoder 955. The host decoder 995 may be a function of the video capture card 825, the main logic board 810, or other internal components. The newly decoded output signal may then be displayed on a confidence monitor 960 such as those previously described. In another embodiment, the newly decoded output signal may be fed into a digital to analog converter 965. The analog signal may then be multiplexed with the original undecoded signal at multiplexer 970. In this manner the input confidence monitor 975 may also be used to display the output signal from the streaming media encoder 900. This allows a single confidence monitor 975 to be used to view both input and output signals for the streaming media encoder 900.

Figure 10:
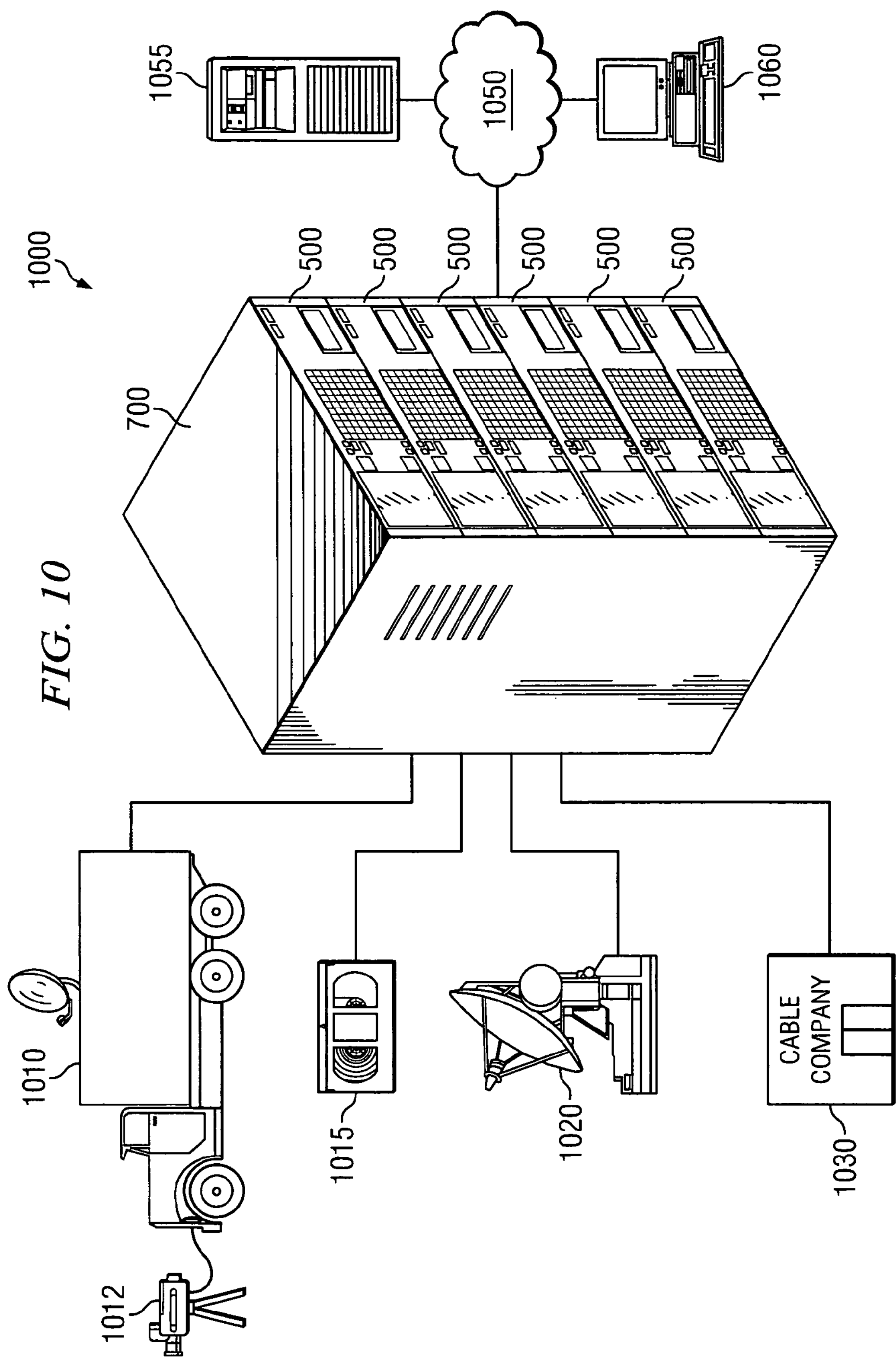
FIG. 10 illustrates one embodiment of an operating environment for one or more streaming media encoders according to aspects of the present disclosure.

Referring now to FIG. 10, one embodiment of an operating environment 1000 for one or more streaming media encoders according to aspects of the present disclosure is shown. One or more streaming media encoders 500, as have been herein described, may be a part of a set or system of streaming media encoders 700. The system 700 may be a rack mounted enclosure. The set of streaming media encoders 700 may be able to handle multiple input and output sessions concurrently. Various sources may provide the content feeds which are to be encoded. A remote location television vehicle 1010 and camera 1012 system may provide a live or tape delayed input to the streaming media encoder system 700. An archival storage system 1015 may also provide an input feed. The archival storage system 1015 may be a database or repository of past broadcast programming, for example. A satellite feed 1020 may also serve as input to the streaming media encoder system 700. Cable television programming feeds 1030 may also be used as input to the encoder system 700.

Each of the streaming media encoders 500 may be separately connected to the network 1015, which may be the Internet. In another embodiment, the streaming media encoders may be connected to a local network which is then connected to the Internet 1050. Through the Internet, the streaming media encoders 500 and/or the encoder system 700 may connect to end users at viewing stations 1060 or to media servers 1055. While the viewing stations 1060 may access real-time streaming content from the streaming media encoder system 700, the media server 1055 may store or archive streaming content for later viewing or access by other users. Users may access the streaming media encoders 500, system 700, or media servers 1055 by a personal computer or other packet based communication system.

Figure 11:
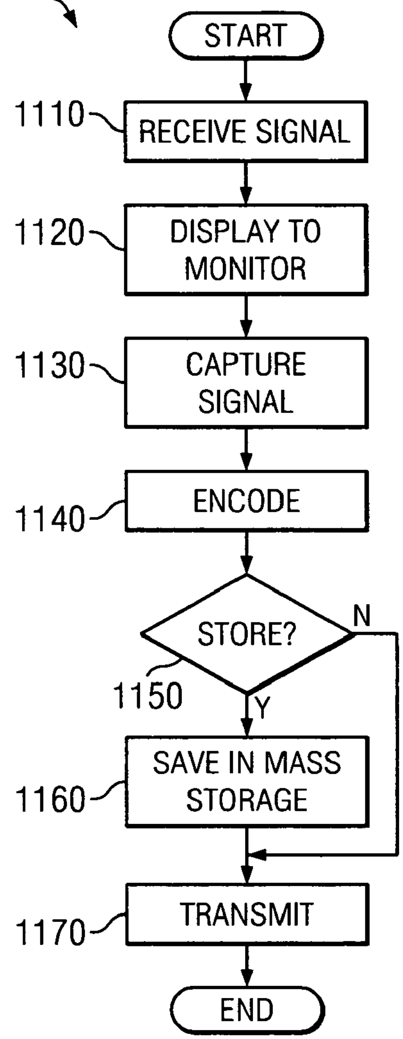
FIG. 11 is a flow chart corresponding to one possible mode of operation of a streaming media encoder according to aspects of the present invention.

Referring also now to FIG. 11, a flow chart 1100 corresponding to one possible mode of operation of a streaming media encoder according to aspects of the present invention is shown. The flow chart 1100 is meant to serve only as an example of a simple receipt and encoding process, as other operations are contemplated within the present disclosure. An input signal is received at step 1100, such as a signal from one of the sources 1010-1030 of FIG. 10. The input signal may be displayed to a front panel confidence monitor of the streaming media encoder at step 1110. The received signal is captured at step 1130 and provided to an encoder where it is encoded into the desired streaming media format at step 1140. At step 1150 if the encoded content is to be stored, it is stored on the mass storage device at step 1160. The signal is then streamed or transmitted to the recipient from the streaming media encoder at step 1170. Although the process has been shown as a series of discrete steps, in practice each of the steps happens substantially concurrently as the input stream and output stream may be substantially continuous.

Figure 12:
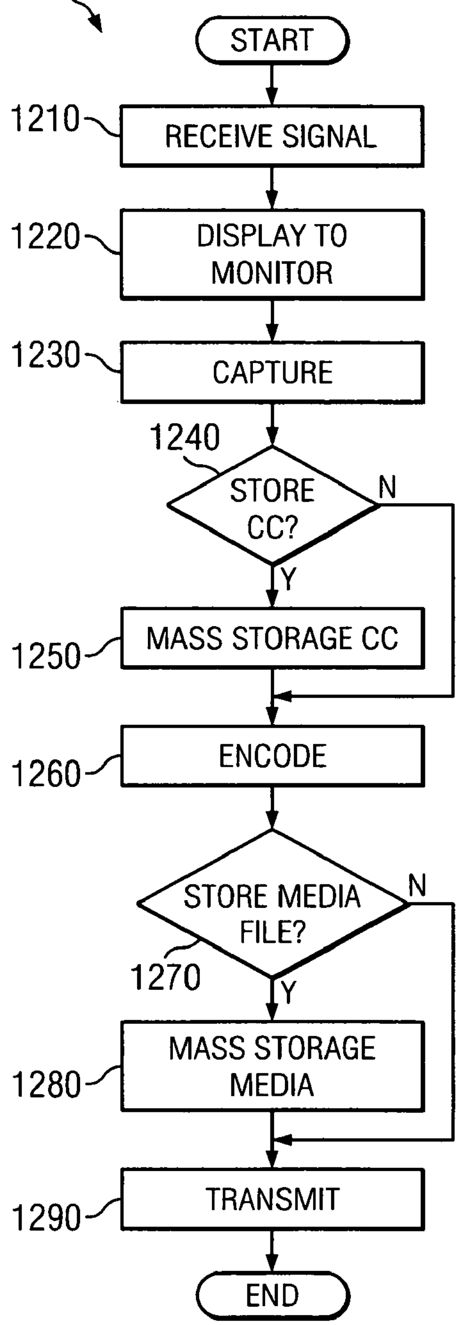
FIG. 12 is a flow chart corresponding to another possible mode of operation of a streaming media encoder according to aspects of the present invention.

Referring now to FIG. 12, a flow chart 1200 corresponding to another possible mode of operation of a streaming media encoder according to aspects of the present invention is shown. Some aspects of the mode of operation shown by flowchart 1200 are similar to those shown in the flow chart 1100 of FIG. 11. For example, the process of the flow chart 1200 includes receiving a signal at step 1210, displaying to a confidence monitor at step 1220, and capturing the signal at step 1230. The capture step 1230 differs from that of FIG. 11 in that a closed captioning feed is also captured from the received signal.

The closed captioning signal provides textual content related to the video and audio signal. In some instances, a transcript of the current broadcast is provided concurrently with the audio and video portions of the broadcast. In other cases, an alternate language transcript of the current broadcast is provided in the closed captioning feed. If the streaming media encoder has been configured to store the closed captioning feed at step 1240, the captured closed captioning feed is then stored at step 1280. In one embodiment, the captured feed is stored as an extensible markup language (XML) file. The captured feed may be stored in a mass storage device for later retrieval and/or archiving.

At step 1260 the audio portion, video portion, and/or closed captioning portion of the received input signal may be encoded. If the streaming media encoder has been configured to store the encoded media file at step 1270, the captured feed may be stored in a mass storage device at step 1280 for later retrieval and/or archiving. At step 1290 the captured and encoded video and audio signal are transmitted, possibly through one or more LAN connections, as previously described.

It will be appreciated by those skilled in the art having the benefit of this disclosure that this invention provides a broadband information appliance. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A streaming media encoder for encoding and delivering media content comprising:

a media input interface for receiving a live, real time media stream from a video source;

a media encoder operable to encode the live, real time media stream from the media input interface, thereby producing a real time encoded media stream, the media encoder including;

a media encoder, the encoder receiving and digitizing the live, real time media stream;

a host encoder, the host encoder receiving the digitized real time media stream and encoding the digitized real time media stream into a selected format and outputting a formatted real time media stream for streaming;

a first confidence monitor, the first confidence monitor operable to display a video image from the live, unencoded real time media stream from the video source;

a second confidence monitor, the second confidence monitor operable to display a video image from the encoded media stream;

a network interface for providing the encoded media stream to a network;

a textual display, the textual display providing status information for the streaming media encoder;

a system status monitor providing a series of navigational menus for display on the textual display;

a plurality of command buttons for selecting menu options to access system status information for the streaming media encoder; and a rack mountable housing having a front panel and a back panel, the front panel configured to support the first and second confidence monitors and the textual display and the back panel configured to support the media input interface and the network interface.

2. The streaming media encoder of claim 1, further comprising a set of user controls for interacting with the streaming media encoder to determine an encoding standard for encoding the media stream.

3. The streaming media encoder of claim 1, wherein the first and second confidence monitors comprise liquid crystal display (LCD) panels.

4. The streaming media encoder of claim 1, further comprising monitor output connectors adapted to provide a signal corresponding to the media stream.

5. The streaming media encoder of claim 1, further comprising a media decoder adapted to decode the encoded media stream and provide a decoded video signal to the second confidence monitor.

6. The streaming media encoder of claim 1, wherein the input interface is digital video interface.

7. The streaming media encoder of claim 1, wherein the internal media encoder is software programmable.

8. The streaming media encoder of claim 1, wherein the streaming media encoder may be configured remotely via a web interface through the network interface.

9. The streaming media encoder of claim 1, further comprising a personal computer (PC) motherboard interconnecting the media input interface, the media encoder, the first confidence monitor, the second confidence monitor, and the network interface.

10. A streaming media encoder for encoding and delivering media content comprising:

a housing having a front panel and back panel;

a local area network (LAN) adapter accessible via the back panel;

an audiovisual input jack accessible via the back panel;

a first LCD display viewable via the front panel operable to display an input video loop signal corresponding to a real time input media stream from the audiovisual media input jack, and for displaying a real time output video loop signal corresponding to an unencoded output media stream;

a multiline LED textual display viewable via the front panel, the textual display providing status information for the streaming media encoder;

a plurality of user interface controls accessible via the front panel including a plurality of command buttons for selecting menu options to access system status information for the streaming media encoder;

an internal control board interfaced with the LAN adapter, the input jack, the first LCD display, the textual display, and the user interface controls;

an internal video encoder adapted to receive the real time input media stream from the audiovisual input jack, provide the input loop signal corresponding the real time input media stream to the LCD display, encode the input media stream into an encoded media stream, and provide the encoded media stream to the control board;

an internal video decoder adapted to receive the encoded media stream from the internal video encoder, decode the encoded media stream into the unencoded output media stream, and provide the output video loop signal corresponding to the unencoded output media stream;

a second LCD display viewable via the front panel operable to display a video image from the encoded media stream;

wherein the control board is adapted to provide the encoded media stream as a real time streaming media stream to a network connected through the LAN.

11. The streaming media encoder of claim 10 wherein the control board is a personal computer (PC) motherboard.

12. The streaming media encoder of claim 10 further comprising a mass storage device interfaced to the control board and adapted to store the encoded media stream.

13. A method for monitoring an encoding process of an audiovisual media a stream, comprising:

receiving a live, real time input signal from an analog audiovisual source;

capturing a text feed from the audiovisual source;

displaying a video image from the live, real time analog audiovisual source on a first confidence monitor mounted in a front panel of a rack mountable housing;

encoding the input signal, including the text feed, to produce an encoded media stream in real time;

displaying an video image from the encoded media stream on a second confidence monitor mounted in the front panel of the rack mountable housing;

providing the encoded media stream to an network interface in real time;

displaying, on a textual display, mounted in the front panel of the rack mountable housing, status information for the streaming media encoder; and using one or more of a plurality of command button to select navigational menus to access system status information for the streaming media encoder.

14. The method of claim 13 further comprising storing the encoded media stream on a mass storage system.

15. The method of claim 13 further comprising storing the captured text feed as an Extensible Markup Language (XML) file on a mass storage system.

16. The method of claim 15 further comprising transmitting the XML file over the network interface.

17. The method of claim 13 wherein encoding comprises converting the analog signal into an MPEG standard format.

18. The method of claim 13 wherein encoding comprises encoding the input signal into an Internet streamable digital format.

19. The streaming media encoder of claim 1 further comprising an input selection switch.

20. The streaming media encoder of claim 1 further comprising a loop input for receiving a test signal for display on the confidence monitor.

21. The streaming media encoder of claim 1 wherein the confidence monitor is a liquid crystal display (LCD).

22. The streaming media encoder of claim 1 further comprising indicator lights for indicating a fault condition.

23. The streaming media encoder of claim 1 wherein the media encoder is a video capture card and encoding logic.

* * * * *